United States Patent [19]
Wright

[11] 3,761,730
[45] Sept. 25, 1973

[54] AUTOMATIC SEAT LATCH UNLOCKING APPARATUS AND CIRCUIT THEREFOR

[75] Inventor: Thomas A. Wright, Grand Rapids, Mich.

[73] Assignee: Hi-Ram Inc., Grandville, Mich.

[22] Filed: July 10, 1972

[21] Appl. No.: 270,452

[52] U.S. Cl. .............. 307/10 R, 317/155, 180/112
[51] Int. Cl. ............................................. B62d 45/00
[58] Field of Search ................... 317/155, DIG. 7; 307/9, 10 R, 141, 141.4, 141.8; 180/82, 103, 112

[56] References Cited
UNITED STATES PATENTS
3,456,164  7/1969  Sternberg ..................... 317/155 X Primary Examiner—Herman J. Hohauser
Attorney—Price, Heneveld, Huizenga & Cooper

[57] ABSTRACT

A solenoid having a pull-in coil and a hold-in coil is adapted to be mounted within the seat back of the front seat of a vehicle such that the plunger associated with the solenoid can be actuated to release the seat locking mechanism. As one of the doors of the vehicle is opened, the solenoid is actuated to unlock the seat-locking mechanism and maintain the mechanism unlocked to allow the seat backs to be moved forward. The pull-in coil is automatically actuated for a predetermined time sufficient to ensure the plunger has been moved to unlatch the locking mechanism after which the pull-in coil is deactuated. The hold-in coil is continuously actuated while the vehicle door is open.

9 Claims, 6 Drawing Figures

PATENTED SEP 25 1973  3,761,730

AUTOMATIC SEAT LATCH UNLOCKING APPARATUS AND CIRCUIT THEREFOR

BACKGROUND OF THE INVENTION

The present invention relates to an apparatus for automatically unlatching the locked seat back of a vehicle, and particularly to a novel electrical circuit and solenoid for use therewith.

With the advent of federal safety regulations requiring that the movable front seat backs of vehicles be locked in the upright position, auto manufacturers have installed latches in their two-door automobiles to satisfy the requirements. The latches have levers which can be manually tripped to release the locking or latching mechanism such that a passenger can move the seat back forward to enter the rear seat area of the automobile. When the seat back is returned to the upright position, it is again securely locked in place.

Recently, some top-of-the-line automobiles have employed an electrically operated solenoid which is actuated by the courtesy light switch in the autos to automatically release the locking mechanism for the seat back when one of the doors have been opened. Thus, it is no longer necessary with this type of arrangement to manually trip a lever to gain entrance to the rear seat. Although greatly adding to the convenience for passengers, such apparatus is a relatively expensive feature and sometimes is troublesome and erratic in operation. Existing automatic solenoid apparatus employ a two-coil solenoid, one coil being employed to initially provide a relatively high pull-in force for the plunger of the solenoid, while the second coil being employed to provide a lower holding force to maintain the seat in the unlocked position while the passengers are entering the vehicle. The coils are coupled to the electrical system of the automobile by means of a mechanically operated electrical switch mounted within the solenoid and which is tripped by the movement of the solenoid plunger to convert the system from the pull-in mode of operation to the hold-in mode of operation by alternately switching the pull-in and hold-in coils into operation.

Such an arrangement has provided unsatisfactory performance and relatively high cost since the solenoid must be mounted in the seat back in relatively critical alignment to ensure that the plunger properly actuates the mechanical switch within the solenoid as the plunger is actuated. Frequently, misalignment during the installation of the solenoid in the seat back during the manufacture of the automobile, causes the plunger to bind thereby not fully contacting the mechanical switch at the end of the plunger travel. The result is that frequently the pull-in coil will pulse in and out causing an audible noise commonly referred to as "machine gunning" which is rather offensive and tends to burn out the solenoid.

In some instances, the pull-in coil can be continuously actuated and will overheat or cause a circuit breaker in the electrical circuit to inactivate the device, making it impossible for the seat back to be moved forward. Thus, the automatically operating solenoids of the prior art have proven unsatisfactory as to their operational characteristics and are relatively costly since they require critical alignment and a special internally mounted switch.

SUMMARY OF THE INVENTION

The solenoid and control circuit of the present invention, however, does not employ a switching arrangement built within the solenoid and which relies on the solenoid plunger travel. Instead, the system of the present invention uses a solenoid having two coils, one for pulling in the solenoid plunger and a second coil for holding the solenoid plunger in. The coils are automatically operated by an electrical circuit which can be remotely positioned and which supplies the pull-in coil with a pulse of predetermined duration sufficiently long to ensure that the solenoid plunger is pulled in. The circuit then automatically removes the power to the pull-in coil while continuously applying power to the hold-in coil. The solenoid does not, therefore, rely on the plunger movement in switching from the pull-in to the hold-in mode of operation. Additionally, the solenoid is simpler in construction since it requires no internally mounted switch. Finally, since the plunger travel is less critical, installation is considerably easier thereby further reducing the cost of such a feature to the auto buyer.

Apparatus embodying the present invention comprises an electrically operated solenoid having a plunger adapted to unlatch the locking mechanism of a vehicle seat back and an electrical control circuit therefor. The solenoid includes a pull-in coil and a hold-in coil, the pull-in coil being actuated by the electrical circuit for a predetermined period of time when the vehicle door is opened and then deactivated while the hold-in coil has continuous power applied to it to hold the solenoid plunger in the unlatched position when the vehicle door is opened.

DETAILED DESCRIPTION OF THE PREFERRED EMBODIMENT

Figure 1:
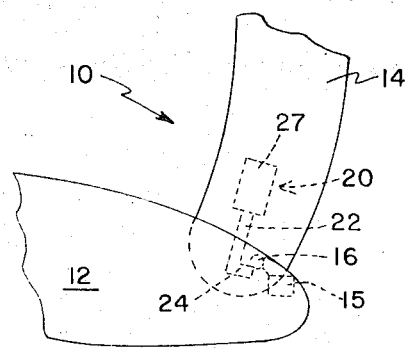
FIG. 1 is a partial side elevational view of a vehicle seat showing the position of a solenoid for automatically releasing the seat back locking mechanism.

FIG. 1 shows a vehicle seat 10 which is a front bucket-type seat employed in automobiles of a two-door design. The seat comprises a seat portion 12 and a hinged back portion 14 which can be moved forwardly to permit access to the rear seat of the automobile (not shown). The seat further includes a latching mechanism 15 (shown in block form) for locking the seat back 14 in an upright position. The latching mechanism includes a release pin 16 and a solenoid 20 having a casing 27 and a plunger 22 with a hooked end 24 which engages the release pin 16. When solenoid 20 is actuated, the release pin 16 will be pulled by the end 24 of the moving plunger 22 thereby unlatching the seat back such that it can be moved forwardly. If is noted that the release pin is spring loaded and holds the plunger 22 in its extended position when the seat back is locked in the upright position.

Figure 2:
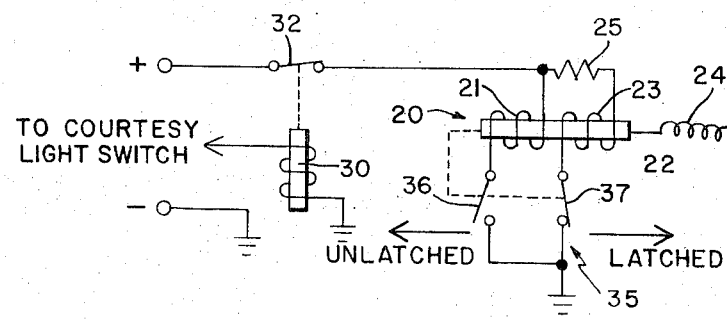
FIG. 2 is a schematic diagram showing the automatic unlatching mechanism of the prior art and the electrical control therefor.

FIG. 2 shows the prior art apparatus for controlling a solenoid 20 such that it will provide a relatively high pull-in force necessary to initially release the locking mechanism by overcoming the resistive force of the release pin 16. Once the plunger 22 of the solenoid 20 has been retracted, however, it is unnecessary to apply as large a pulling force, a lesser force being adequate to hold the plunger in its retracted position whereby the seat latch is in the unlocked position. This dual force arrangement is accomplished by the circuitry of FIG. 2 in which the plunger 22 is illustrated in pictorial form and the mechanical equivalent of the release pin 16 is shown as a spring 24 anchored to a fixed member 26. When the seat back is in its locked upright position, the solenoid plunger 22 will be moved towards the right side as indicated by the arrow labeled "latched."

It is convenient to employ the courtesy light switch as a control means for unlatching the seat back since the seat back 14 (FIG. 1) normally is moved forward when one of the doors is opened. This is accomplished by means of a relay 30 (FIG. 2) which is coupled to the courtesy light switch such that when the courtesy lights are actuated by opening a door, the relay 30 having contacts 32 associated therewith is simultaneously actuated. Relay 30 is of the normally open type and the switch contacts 32 are coupled between the positive supply bus coupled to the automobile battery (in a negative ground system) and two coils 21 and 23 associated with the solenoid 20. The coil 21 is the pull-in coil and the coil 23 is the hold-in coil.

As seen in FIG. 2, a switch 35 has one set of contacts 36 in series with the pull-in coil 21 and another set of contacts 37 in series with the hold-in coil 23. The switch 35 is physically mounted within the solenoid 20 such that contacts 36 will be closed when the plunger is in its extended or latched position to the right, and will be opened when the plunger is moved to its retracted positions within the solenoid housing, as illustrated in FIG. 2. The mechanical coupling of the switch contacts 36 and 37 of switch 35 to the plunger 22 of the solenoid 20 is represented by the dotted lines in the figure. Switch 37 will normally be open when plunger 22 is in its extended (latched) position and will close when the plunger has been pulled into its retracted position. In some applications, the switch 37 can be omitted and coil 23 directly coupled to ground.

The circuit of FIG. 2 is shown with the relay in the unlatched position. The holding coil 23 is actuated by means of power applied through the closed contacts 32 of the relay 30, through a current-limiting resistor 25 in series with the holding coil 23, and the closed contact 37 which completes the circuit path between the positive supply bus and ground.

Once the door of the vehicle has been closed, contacts 32 will open thereby disconnecting the voltage source from the relay coils 21 and 23 and the plunger 22 will be returned to its locked position by the spring bias 23 of the release pin 16 (FIG. 1). In this position, the contacts 36 of the mechanical switch 35 will be closed and the contacts 37 will be opened. Once the vehicle door is reopened the contacts 32 are again closed and switch 36 will initially actuate the pull-in coil 21 to cause the plunger to move and actuate switch 35 such that contacts 36 open and contacts 37 close. The making and breaking of the contacts 36 is critical since the pull-in coil 21 draws a considerable amount of current necessary to initially overcome the resistive force of the release pin 16.

If the housing 27 of the solenoid 20 is misaligned in the seat back 14 during installation and the plunger 22 binds against surrounding parts of the seat back 14 or the locking mechanism, the plunger 22 may not retract fully enough to open switch contacts 36 and the excessive current drawn through the pull-in coil 21 will, within a short period of time, cause the circuit breaker or fuse of the electrical system to become actuated. Alternately, if the plunger 22 moves sufficiently to initially open the switch 36 but not close the switch 37, the plunger will again return to its latched position thereby causing the switch 36 to close causing the plunger 22 to again move toward the unlatched position. This cycle may repeat at a relatively high frequency to produce the objectionable machine gunning noise. Thus, the switching arrangement incorporated in the solenoid 20 of the prior art shown in FIG. 2 has proven unsatisfactory.

Figure 3:
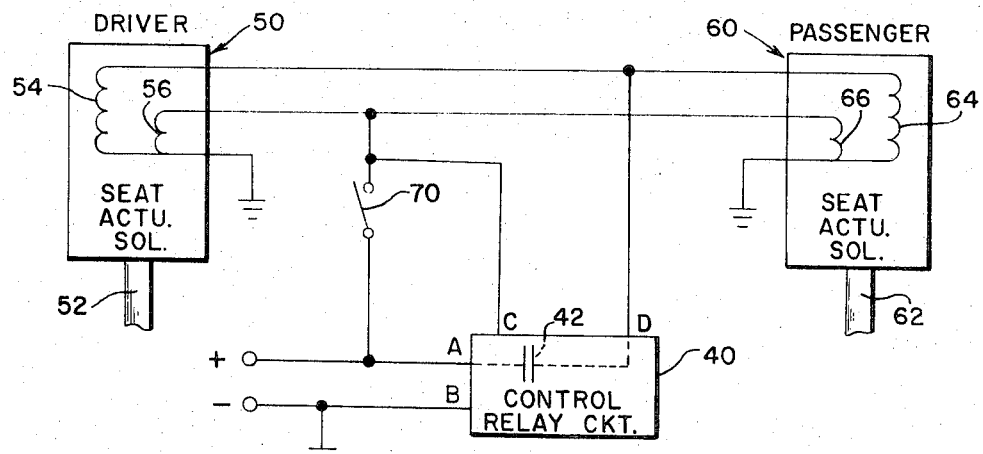
FIG. 3 is an electrical circuit diagram partially in schematic and block form showing one embodiment of the present invention.

Referring now to FIG. 3, there is shown a solenoid and circuit arrangement which overcomes the deficiency of the prior art as noted above and which employs a time-delayed control relay circuit 40 to provide the desired control. There is shown in FIG. 3 a solenoid 50 which is on the driver's side and a solenoid 60 on the pasenger's side. Each solenoid has a plunger 52 and 62 which corresponds to the plunger 22 of the solenoid shown in FIG. 1. The solenoids 50 and 60 can be identical and include pull-in coils 54 and 64 and hold-in coils 56 and 66. In some applications the solenoid plungers 52 and 62 may actually be pushed instead of pulled by the coils 54 and 64 respectively; the control circuit, however, remains the same.

A door jam or courtesy light switch 70 is coupled in series between a positive terminal of the automobile supply voltage and a terminal C of the control relay circuit 40. Terminal C is also directly coupled to the hold-in coils 56 and 66 of the solenoids 50 and 60 respectively. It is seen, therefore, that when the switch 70 is actuated by opening one of the doors, the hold-in coils 56 and 66 are actuated. A terminal B of the circuit 40 is coupled to the negative or ground supply of the vehicle and a terminal D is coupled to the pull-in coils 54 and 64 of the solenoids 50 and 60 respectively. The control relay circuit serves to provide a voltage pulse of a predetermined duration at terminal D which is sufficient to cause the solenoid plungers 52 and 62 to initially overcome the holding tension of the locking mechanism 15 (FIG. 1) such that they will unlatch the seat back. The control circuit 40 accomplishes this function by momentarily closing the contacts 42 shown in phantom form in FIG. 3 by means of the circuitry of circuit 40 which is shown in detail in FIG. 4.

Figure 4:
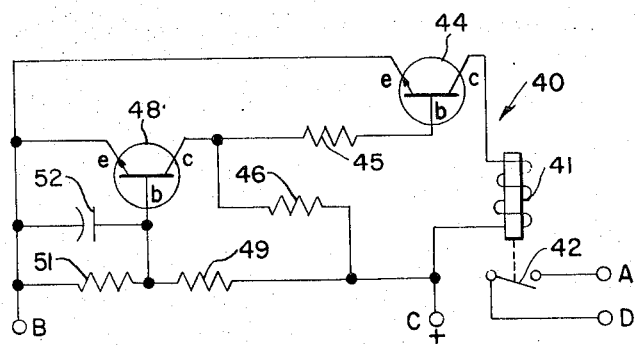
FIG. 4 is an electrical circuit diagram in schematic form showing one portion of the circuitry shown in block form in FIG. 3.

Referring now to FIGS. 3 and 4, it is seen that the terminal B is grounded and that terminal C is coupled to the positive voltage supply when the courtesy light switch is closed. The control circuit 40 of FIG. 4 includes a control relay coil 41 having a pair of normally open contacts 42 which are coupled between terminal A and D as shown. The relay coil 41 has one terminal coupled to terminal C and the other terminal coupled to a collector terminal 44c of a first transistor 44. An emitter terminal 44e of transistor 44 is coupled directly to terminal B. A base terminal 44b of transistor 44 is coupled to terminal C by means of a first resistor 45 and a second resistor 46 coupled in series from terminal 44b to terminal C. The junction of resistors 45 and 46 is coupled to a second transistor 48 at a collector terminal 48c thereof. An emitter terminal 48e of transistor 48 is coupled directly to terminal B. A base terminal 48b of transistor 48 is coupled to terminal C by means of a third resistor 49 and to terminal B by means of a fourth resistor 51. A capacitor 52 is coupled in parallel with resistor 51.

In operation, as the vehicle door is opened, switch 70 will close thereby applying the positive voltage from the battery of the vehicle to the hold-in coils 56 and 66 of the solenoids 50 and 60 respectively as well as to terminal C of the control circuit of FIG. 4. At this time, it is also desired to actuate the pull-in coils 54 and 64. This is accomplished by applying power coupled from terminal A of the circuit to terminal D of the circuit through the closed contacts 42 of the relay 41. Relay coil 41 is actuated as the voltage is applied to terminal C by means of transistor 44 which conducts as voltage is initially applied to terminal C. The collector current of transistor 44 is sufficient to cause the relay coil 41 to pull the contacts 42 to the closed position thereby applying the positive voltage from the battery through contacts 42 to the pull-in coils 54 and 64 of solenoids 50 and 60 respectively.

It is noted that at this time (i.e., when the voltage at terminal C is initially applied) capacitor 52 will be uncharged and transistor 48 will be nonconductive. As the switch 70 remains closed and applies power to terminal C, however, capacitor 52 will charge through the resistor 49 until the transistor 48 is forward biased and conducts. Collector current for transistor 48 is supplied through the collector resistor 46 coupled to terminal C. As transistor 48 is rendered conductive, the collector voltage at terminal 48c will decrease markedly. Since the collector terminal 48c is coupled by means of resistor 45 to the base terminal 44b of transistor 44, as the collector voltage of transistor 48 decreases, it will pull down the base voltage of transistor 44 until the latter transistor becomes nonconductive. As this occurs, the current through relay coil 41 is cut off and contacts 42 will open thereby removing the power from the pull-in coils 54 and 64 of solenoid 50 and 60 respectively.

The time that transistor 44 is conductive to allow the contacts 42 to remain closed is dependent upon the charging time constant of the capacitive-resistive network 52 and 49 together with the biasing of the transistors 44 and 48. The value of resistors 49 and capacitor 52 is chosen such that transistor 44 is conductive for a period long enough to ensure that the solenoid plungers 52 and 62 have been pulled in to their unlatched position. In one embodiment, 100 milliseconds was a sufficient period of time to ensure this operation. Resistor 51 serves as a bleeder resistor once the circuit has been inactivated to discharge capacitor 52. The solenoid shown in FIG. 3 can be incorporated into the seat back in a manner similar to that shown in FIG. 1 to provide the desired unlatching of the locking mechanism.

Figure 5:
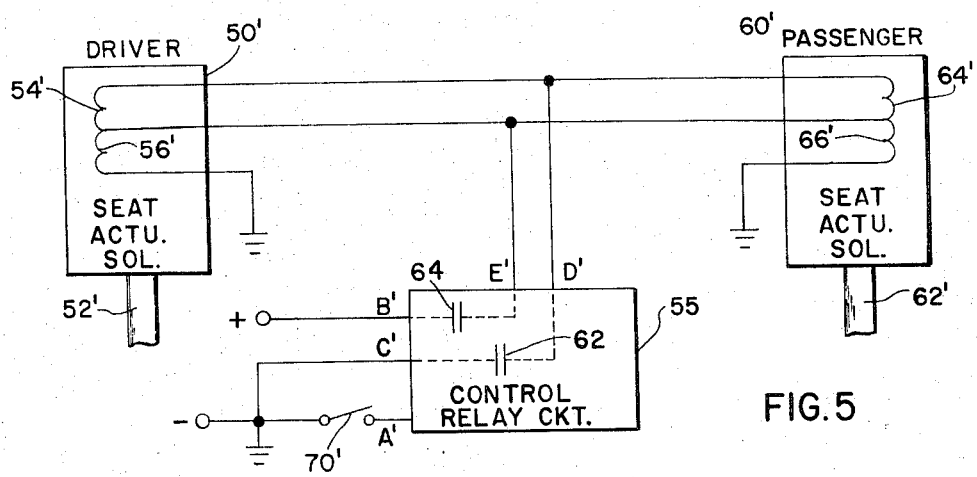
FIG. 5 is an electrical circuit diagram partially in schematic and block form showing an alternative embodiment of the present invention.
Figure 6:
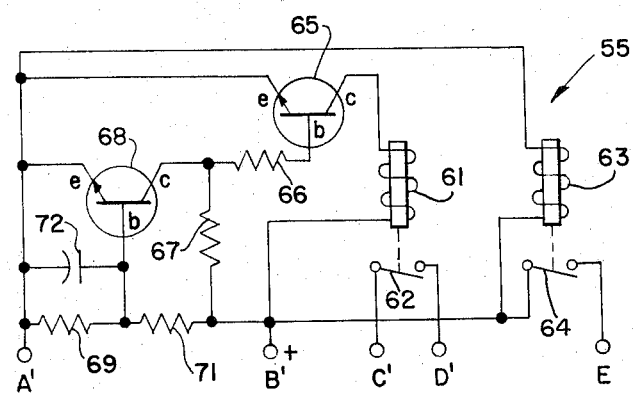
FIG. 6 is an electrical circuit diagram in schematic form showing the details of one portion of the circuitry shown in block form in FIG. 5.

An alternative embodiment for use with a grounding-type of courtesy light switch and which employs a single winding within the solenoid and a tap terminal to form the pull-in and hold-in coils is shown in FIGS. 5 and 6. The control relay circuit 55 is modified to provide the desired dual control through the solenoids by first applying power to terminal E from the positive supply bus of the vehicle through closed contacts 64 (FIG. 5) and simultaneously grounding terminal D' through closed contacts 62. Thus, during the pull-in mode of operation, coils 54', 56', 64', and 66' are all actuated to provide a maximum pull-in force for the associated plungers 52' and 62' of solenoids 50' and 60' respectively.

After a predetermined time delay, contacts 62' open and pull-in coils 54' and 64' are thereby electrically disconnected from the power supply. This terminates the pull-in mode of operation since the plungers 52' and 62' have had sufficient time to retract and unlatch the seat-locking mechanism. Hold-in windings 56' and 66' remain activated to hold the seat locking mechanism in the unlatched position. This dual control effect is achieved by means of the circuitry shown in detail in FIG. 6 which operates the relay contacts 62 and 64 (FIGS. 5 and 6) to actuate the pull-in and hold-in coils 54', 56', 64', and 66' respectively.

Control circuit 55 includes a first relay coil 63 having one terminal coupled to terminal B' and another terminal coupled to terminal A'. Relay contacts 64 are coupled between terminals B' and E and are associated with coil 63. These contacts close when the coil 63 is activated. The control circuit 55 includes a second relay coil 61 which, when actuated, closes the associated contacts 62 to ground terminal D' during the pull-in mode of operation. One terminal of the relay coil 61 is coupled to the positive supply bus by means of terminal B' while the other terminal of relay coil 61 is coupled to a collector terminal 65c of a first transistor 65. An emitter terminal 65e of transistor 65 is directly coupled to terminal A'. A base terminal 65b of transistor 65 is coupled to terminal B' by serially coupled resistors 66 and 67. The junction of resistors 66 and 67 is coupled to a collector terminal 68c of second transistor 68. The emitter terminal 68e of transistor 68 is coupled directly to terminal A'. A base terminal 68b of transistor 68 is coupled to terminal B' by means of a resistor 71, and to terminal A' by means of a resistor 69. Capacitor 72 is coupled in parallel with resistor 69.

In operation, the circuitry shown in FIGS. 5 and 6 operates to actuate the pull-in coils 54' and 64' momentarily as the courtesy light switch 70' (FIG. 5) is actuated by initially closing both relay contact switches 62 and 64. Transistor 65 conducts momentarily and the collector current therethrough actuates relay coil 61 to close contact 62 thereby grounding the terminal D' and coupling the pull-in coils 54' and 64' in the circuit. Once capacitor 72 has charged sufficiently to render transistor 68 conductive, transistor 65 will be rendered nonconductive and the relay contact switch 62 will open and disconnect the pull-in coils 54' and 64'. It is noted that the hold-in coils 56' and 66' which are directly actuated by the relay coil 63 and continuously operate when the switch 70' is closed, will remain in the circuit to hold the plungers 52' and 62' in the retracted position.

In this manner, therefore, the desired dual control of the solenoids is achieved with the grounding-type of courtesy light switch and with a single winding for each solenoid, the single winding having a tap terminal to define the pull-in and hold-in coils. It will become appar- The embodiments of the invention in which an exclusive property or privilege is claimed are defined as follows:

1. An apparatus for automatically unlatching a seat back of a vehicle comprising:
   a locking mechanism adapted to be mounted within the seat back of a vehicle and which includes a release mechanism;
   a solenoid having a movable plunger adapted to be fitted within said seat back of said vehicle such that said movable plunger engages said release mechanism therein, said solenoid further comprising a pull-in coil and a hold-in coil; and
   control means for activating said pull-in coil by supplying current to said pull-in coil for a predetermined time to provide a pulling force on said plunger sufficient to unlatch said locking mechanism and then deactivating said pull-in coil while supplying current to said hold-in coil to provide a holding force on said movable plunger sufficient to hold said movable plunger in position to maintain said locking mechanism in its unlatched position.

2. The apparatus of claim 1 wherein said pull-in coil and said hold-in coil are formed from a single winding having terminals at either end thereof and having a tap terminal at a point between said end terminals, said pull-in coil being between one end terminal and said tap terminal, and said hold-in coil being between the other end terminal and said tap terminal.

3. The apparatus of claim 1 wherein said control means comprises a source of operating potential and a time-delay relay coupled in series between said pull-in coil and said source of operating potential for actuating said coil for a predetermined period of time.

4. The apparatus of claim 1 and further comprising means for actuating said control means when a door of said vehicle is opened.

5. The apparatus of claim 4 wherein said actuating means comprises a courtesy light switch mounted on said vehicle such that said switch is actuated when said vehicle door is opened.

6. A seat back release mechanism comprising:
   a vehicle having a releasable locking mechanism for locking a vehicle seat back in a predetermined position;
   a solenoid having a pull-in coil, a hold-in coil and a plunger, said plunger mechanically coupled to said locking mechanism such that when said plunger is moved by actuating said solenoid, said locking mechanism is unlocked thereby allowing said seat back to be moved; and
   a control circuit for applying current of a sufficient magnitude to said pull-in coil for a predetermined time, to apply a pulling force on said solenoid plunger sufficient to unlatch the releasable locking mechanism, said circuit additionally applying current to said hold-in coil sufficient to provide a lesser holding force to said plunger to maintain the locking mechanism in an unlocked position.

7. The apparatus of claim 6 in which said vehicle includes an electrical switch operated by the opening of a door of said vehicle and said control circuit is coupled to said switch to be activated when said vehicle door is opened.

8. The apparatus of claim 7 wherein said control circuit comprises a relay having a pair of contacts coupled in series between a source of operating potential and said pull-in coils, and a relay coil; a transistor having base, collector, and emitter terminals, said collector and emitter terminals coupled between said relay coil and said source of operating potential such that collector current in said transistor controls the closure state of said relay contacts; and time-delay means coupled to the base terminal of said transistor for controlling the conduction of said transistor such that said pull-in coil is activated for said predetermined time.

9. The apparatus of claim 8 wherein said time-delay means comprises a resistor serially coupled to a capacitor, the combination coupled to said source of operating potential; and a second transistor having base, collector and emitter terminals, said collector terminal of said second transistor coupled to said base terminal of said transistor, said base terminal of said second transistor coupled to one terminal of said capacitor, and said emitter terminal of said second transistor coupled to the other terminal of said capacitor such that as said capacitor becomes charged, said second transistor conducts thereby causing said transistor to become nonconductive and said relay contacts to open thereby inactivating said pull-in coil after said predetermined time.

* * * * *